United States Patent [19]
Wilson et al.

[11] Patent Number: 5,614,806
[45] Date of Patent: Mar. 25, 1997

[54] BATTERY CHARGER

[76] Inventors: Nathaniel B. Wilson, 11346-8 Portobelo, San Diego, Calif. 92124; Elbert A. McLaren, II, 11291 Paul Barwick Ct., San Diego, Calif. 92126

[21] Appl. No.: 346,976

[22] Filed: Nov. 29, 1994

[51] Int. Cl.$^6$ ....................................................... H02J 7/00
[52] U.S. Cl. ............................................................. 320/22
[58] Field of Search ............................ 320/21–24, 27–29, 320/39, 5

[56] References Cited

U.S. PATENT DOCUMENTS

| | | | |
|---|---|---|---|
| 5,018,188 | 5/1991 | Kowalski et al. | 379/63 |
| 5,113,127 | 5/1992 | Hoffman et al. | 320/21 |
| 5,113,128 | 5/1992 | Ohara et al. | 320/21 |
| 5,115,182 | 5/1992 | Ehmke et al. | 320/22 |
| 5,150,031 | 9/1992 | James et al. | 320/39 |
| 5,317,249 | 5/1994 | Ford | 320/22 |
| 5,325,040 | 6/1994 | Bogut et al. | 320/22 |
| 5,333,176 | 7/1994 | Burke et al. | 379/58 |
| 5,422,559 | 6/1995 | Hall et al. | 320/21 |

*Primary Examiner*—Peter S. Wong
*Assistant Examiner*—K. Shin

[57] ABSTRACT

The battery charging system of the present invention charges the battery of a portable, multiple mode radiotelephone while the radiotelephone is operating. The radiotelephone generates a clock signal having varying on/off times dependent on the radiotelephone's mode. This mode can include an analog cellular mode or a digital cellular mode. The battery charger detects the clock signal's on/off times and changes the average charge current to compensate for one mode requiring a larger charge current.

11 Claims, 1 Drawing Sheet

BATTERY CHARGER

BACKGROUND OF THE INVENTION

I. FIELD OF THE INVENTION

The present invention relates to batteries. More particularly, the present invention relates to a battery charger having a variable current output.

II. DESCRIPTION OF THE RELATED ART

The present capacity problems of the analog cellular radiotelephone system, advanced mobile phone system (AMPS), has necessitated development of other cellular technologies to relieve this burden. These new digital systems include the time division multiple access (TDMA) and the code division multiple access (CDMA) systems.

While the new cellular systems are coming on line, there are going to be many more AMPS systems than any of the new digital systems. Therefore, in order for a user to be able to use a radiotelephone in multiple service areas, the telephone must be able to operate in the AMPS system as well as one of the digital cellular systems; thus requiring newly designed radiotelephones to be dual mode.

Each type of cellular system has different power requirements. For example, an analog type AMPS radiotelephone typically transmits at higher power levels than a typical CDMA radiotelephone. This puts greater power demands on the battery or other device powering the unit.

If the radiotelephone is connected to a battery charger for recharging and the radiotelephone is operating while connected, the radiotelephone may require more power from the charger to operate properly while simultaneously charging the battery. Also, since the radiotelephone has the capability of operating in multiple systems, it is going to require a greater power output from the charger when it is operating in the AMPS mode as opposed to the CDMA mode. There is a resulting need for a battery charger that can change its output current in response to the mode of the radiotelephone.

SUMMARY OF THE INVENTION

The battery charger of the present invention senses the mode of a multiple mode radiotelephone and changes the average charge current to the radiotelephone in response to that mode. The radiotelephone outputs a clock signal that varies the clock on/off time for each mode. The charger senses the clock and changes the charge current accordingly. The radiotelephone turns the clock on and off at a different rate to obtain the desired charge current.

In the preferred embodiment, a radiotelephone in the AMPS mode outputs a clock signal for a longer period of time than the clock for the CDMA mode. A clock detection circuit in the charger senses this and increases the average charge current.

DETAILED DESCRIPTION OF THE PREFERRED EMBODIMENT

Figure 1:
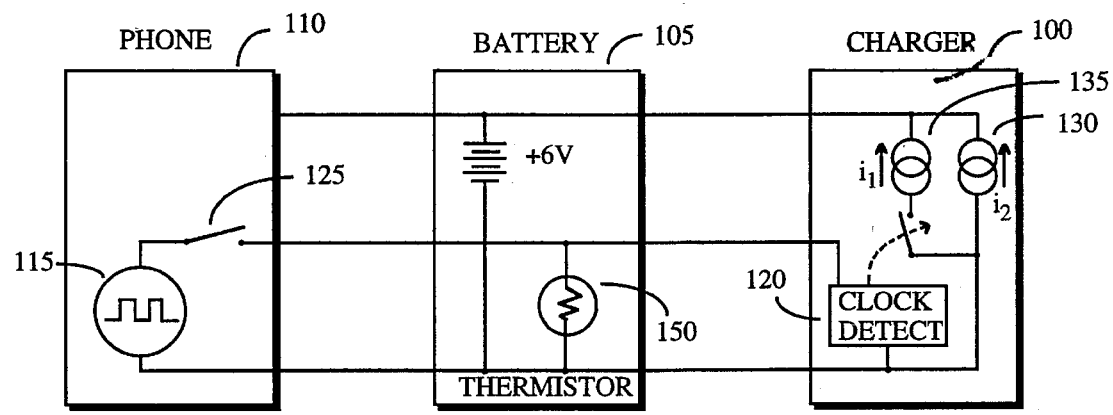
FIG. 1 shows a block diagram of the battery charging system of the present invention.

A block diagram of the battery charging system of the present invention is illustrated in FIG. 1. The system includes the battery charger (100), the radiotelephone battery (105), and the radiotelephone (110). In the preferred embodiment, the battery uses nickel metal hydride technology. However, alternate embodiments use other battery types such as nickel cadmium.

The radiotelephone (110), in the preferred embodiment, is a dual mode unit that can operate in both the AMPS system and the CDMA cellular system. In alternate embodiments, the radiotelephone can operate in other systems such as the TDMA cellular system, a satellite communications system, or a personal communication system (PCS).

The radiotelephone (110) generates a clock signal (115) whose on/off time is dependent on the radiotelephone's mode, whether digital cellular or analog cellular. The on/off time is controlled by a switch (125) in the radiotelephone (110). The radiotelephone's controller controls the operation of the switch (125) depending on the unit's mode.

The clock signal is connected to the battery charger (100) that has a clock detection circuit (120). The clock detection circuit (120) senses the on/off time of the clock.

The battery (105) of the present invention includes a thermistor (150) to prevent overcharging of the battery. As the battery (105) charges, its heat output increases. The thermistor (150) senses the temperature change and increases resistance as the temperature increases. The battery charger (100) monitors the resistance of the thermistor (150) and turns off the charge current completely when the resistance reaches a predetermined level and the clock signal is not being detected. If the clock signal is detected, the radiotelephone (110) is still operating and requires the charge current to operate without draining the charged battery (105).

The multiple function sense line (160) of the present invention connects the thermistor (150) to the battery charger (100). This sense line (160) also carries the clock signal from the clock generator (115) to the battery charger (100). The superimposed clock signal does not impede the monitoring of the thermistor and the thermistor does not impede detection of the clock. Using this single, multiple function line allows two functions to be accomplished with only one connection.

Figure 2:
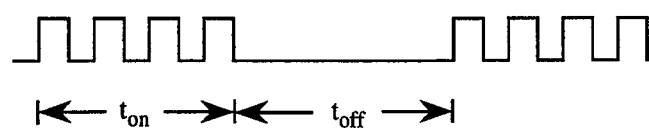
FIG. 2 shows the clock waveform generated in accordance with the present invention.

The clock signal is illustrated in FIG. 2. This clock signal is on for time $t_{on}$ and off for time $t_{off}$. These two times are used by the clock detection circuit to control the average charge current being supplied to the radiotelephone and battery. In the preferred embodiment, the clock $t_{on}$ and $t_{off}$ times are used as follows to determine the average charge current:

$$\text{average charge current} = i_1 \frac{t_{on}}{t_{on} + t_{off}} + i_2,$$

where $i_1$ is the current supplied by the first current source and $i_2$ is the current supplied by the second current source.

The $t_{on}$ and $t_{off}$ times are different for the different modes of the radiotelephone. In the preferred embodiment, the digital cellular mode has a $t_{on}$ of 420 milliseconds and a $t_{off}$ of 860 ms. Also in the preferred embodiment, the analog AMPS cellular mode has a $t_{off}$ time of 0 ms. In other words, the clock is always on in the AMPS mode. Alternate embodiments use different clock $t_{on}$ and $t_{off}$ times.

The current sources (130 and 135) illustrated in FIG. 1 generate a fixed output current when connected to ground. The second current (130) source is always connected to ground. The first current source (135) is connected to ground through a switch (140). This switch (140) is controlled by the clock detection circuit (120) and is closed for the amount of time dictated by $t_{on}/(t_{on}+t_{off})$. When the switch (140) is closed, current $i_1$ is flowing and the charger current output is $i_1+i_2$. When the switch is open, only current $i_2$. is being output from the charger. If the radiotelephone (110) with the battery (105) is not present in the charger (100), the current sources (130 and 135) are not grounded and, therefore, do not generate current.

In operation, if a radiotelephone (110) operating in the AMPS mode is connected to the charger (100), the radiotelephone (110) is generating a clock that is on all the time. The clock detection circuit (120) switches (120) the $i_1$ current such that $i_1$ is generated all the time. This results in an average charge current from the charger of $i_1+i_2$.

Similarly, if a radiotelephone (110) operating in the CDMA mode is connected to the charger (100), the radiotelephone (110) is generating a clock that is on for 420 ms and off for 860 ms. The clock detection circuit (120) switches the $i_1$ current such that $i_1$ is generated approximately one third of the time. Using the above equation, this results in an average charge current from the charger of $0.33i_1+i_2$.

Alternate embodiments of the present invention use other processes to determine the average charge current. Still other embodiments use different $t_{off}$ and $t_{on}$ times. As an example, in the AMPS mode, if the current required for stand-by operation decreased in the future, the $t_{off}$ time will be increased to a non-zero value in order to decrease the average charge current.

The charger and charging system of the present invention, therefore, enables a radiotelephone operating in different modes to use the same charger. Even though the radiotelephone may be operating while in the charger, the charger is able to determine the mode and, therefore, the current required by the radiotelephone to both operate the radiotelephone and charge the battery simultaneously.

We claim:

1. A battery charger, having at least a first and a second charging mode, for charging a battery in a battery powered device having at least a first and a second operating mode, the battery charger comprising:

a clock signal input for receiving a clock signal from the battery powered device, the battery powered device outputting a first clock signal during the first operating mode and a second clock signal during the second operating mode;

a clock detection circuit for detecting the first clock signal and the second clock signal; and a variable current source for generating a first current in the first charging mode when the first clock signal is detected and a second current in the second charging mode when the second clock signal is detected.

2. A battery charger, having at least a high output mode and a low output mode, for charging a battery in a battery powered radiotelephone having a digital operating mode and an analog operating mode, the battery charger comprising:

a clock signal input for receiving a clock signal from the battery powered radiotelephone, the battery powered radiotelephone outputting a first clock signal during the analog operating mode and a second clock signal during the digital operating mode;

a clock detection circuit for detecting the first clock signal and the second clock signal; and a variable current source for generating a first current in the high output mode when the first clock signal is detected and a second current in the low output mode when the second clock signal is detected, the first current being larger than the second current.

3. The battery charging apparatus of claim 2 wherein the first clock signal has a longer clock on time than the second clock signal.

4. A battery charger, having an average charge current, for charging a battery in a battery powered radiotelephone having a digital operating mode and an analog operating mode, the charger also supplying power to the radiotelephone, the battery charger comprising:

a clock signal input for receiving a clock signal from the battery powered radiotelephone, the clock signal having varying on and off times in response to the digital operating mode and the analog operating mode;

a clock detection circuit for detecting the varying on and off times;

a first current source for generating a first current; and a second current source for generating a second current, the first and second current sources together generating the average charge current in response to the varying on and off times.

5. The battery charger of claim 4 wherein the charge current is substantially equal to: $i_1(t_{on}/(t_{on}+t_{off}))+i_2$ where $i_1$ is the first current, $i_2$ is the second current, $t_{on}$ is a time the clock signal is on, and $t_{off}$ is a time the clock signal is off.

6. A method for charging a battery in a battery powered device having a digital operating mode and an analog operating mode, the method comprising the steps of:

the battery powered radiotelephone generating a clock signal, the clock signal having varying on and off times in response to the digital operating mode and the analog operating mode;

detecting the varying on and off times; and generating an average charge current in response to the varying on and off times.

7. A method of charging a battery in a battery charger having at least a first and a second charging mode, the charger charging a battery in a battery powered device having at least a first and a second operating mode, the method comprising the steps of:

generating, in the battery powered device, a first clock signal during the first operating mode and a second clock signal during the second operating mode;

detecting, in the battery charger, the first clock signal and the second clock signal; and generating, in the battery charger, a first current in the first charging mode when the first clock signal is detected and a second current in the second charging mode when the second clock signal is detected.

8. A method of charging a battery in a battery charger having at least a high output mode and a low output mode, the charger charging a battery in a battery powered radiotelephone having a digital operating mode and an analog operating mode, the method comprising the steps of:

generating, in the battery powered radiotelephone, a first clock signal during the analog operating mode and a second clock signal during the digital operating mode;

detecting, in the battery charger, the first clock signal and the second clock signal; and generating, in the battery charger, a first current in the high output mode when the first clock signal is detected and a second current in the low output mode when the second clock signal is detected, the first current being larger than the second current.

9. The method of claim 8 wherein the first clock signal has a longer clock on time than the second clock signal.

10. A method of generating an average charge current in a battery charger, the charger charging a battery in a battery powered radiotelephone having a digital operating mode and an analog operating mode, the charger also supplying power to the radiotelephone, the method comprising the steps of:

generating, in the battery powered radiotelephone, a clock signal having varying on and off times in response to the digital operating mode and the analog operating mode;

detecting, in the battery charger, the varying on and off times; and generating, in the battery charger, the average charge current in response to the varying on and off times.

11. The method of claim 10 wherein the charge current is substantially equal to: $i_1(t_{on}/(t_{on}+t_{off}))+i_2$ where $i_1$ is the first current, $i_2$ is the second current, $t_{on}$ is a time the clock signal is on, and $t_{off}$ is a time the clock signal is off.

\* \* \* \* \*